US012640315B2

(12) United States Patent
Chen et al.

(10) Patent No.: US 12,640,315 B2
(45) Date of Patent: May 26, 2026

(54) ADVANCED LITHIUM-ION ENERGY STORAGE DEVICE

(71) Applicant: NANORAMIC, INC., Woburn, MA (US)

(72) Inventors: Ji Chen, Boston, MA (US); Wanjun Ben Cao, Boston, MA (US); Kitae Park, Brookline, MA (US); Nicolo M. Brambilla, Brookline, MA (US); Jin Yan, Malden, MA (US); John Hyde, Ashland, MA (US); Mackenzie Cash, Boston, MA (US)

(73) Assignee: NANORAMIC, INC., Woburn, MA (US)

( * ) Notice: Subject to any disclaimer, the term of this patent is extended or adjusted under 35 U.S.C. 154(b) by 0 days.

(21) Appl. No.: 17/606,301

(22) PCT Filed: Oct. 19, 2021

(86) PCT No.: PCT/US2021/055562
§ 371 (c)(1),
(2) Date: Apr. 28, 2022

(87) PCT Pub. No.: WO2022/086930
PCT Pub. Date: Apr. 28, 2022

(65) Prior Publication Data
US 2023/0360863 A1 Nov. 9, 2023

Related U.S. Application Data

(60) Provisional application No. 63/093,441, filed on Oct. 19, 2020.

(51) Int. Cl.
*H01G 11/36* (2013.01)
*H01G 11/06* (2013.01)
(Continued)

(52) U.S. Cl.
CPC ............. *H01G 11/36* (2013.01); *H01G 11/06* (2013.01); *H01G 11/24* (2013.01); *H01G 11/50* (2013.01); *H01G 11/86* (2013.01)

(58) Field of Classification Search
CPC ........ H01G 11/36; H01G 11/06; H01G 11/24; H01G 11/50; H01G 11/86
(Continued)

(56) References Cited

U.S. PATENT DOCUMENTS 9,001,495 B2 4/2015 Martini et al.
9,218,917 B2 12/2015 Brambilla et al.
(Continued)

FOREIGN PATENT DOCUMENTS

CN 210123779 U 3/2020
EP 2960913 A1 12/2015
(Continued)

OTHER PUBLICATIONS

International Search Report for International Application No. PCT/US2021/055562; International Filing date Oct. 19, 2021; Report Mail Date Jul. 20, 2022; 5 pages.
(Continued)

*Primary Examiner* — Arun Ramaswamy

(57) ABSTRACT
A lithium ion capacitor includes binder free positive and negative electrode active layers. The capacitor exhibits high energy density, power density and cycle life and provides a good compromise in performance between an electric double layer capacitor and a lithium ion battery.

20 Claims, 9 Drawing Sheets

(51) Int. Cl.
*H01G 11/24* (2013.01)
*H01G 11/50* (2013.01)
*H01G 11/86* (2013.01)

(58) Field of Classification Search
USPC ................................................ 361/502, 503
See application file for complete search history.

(56) References Cited

U.S. PATENT DOCUMENTS

| | | | |
|---|---|---|---|
| 10,600,582 B1 | 3/2020 | Brambilla et al. | |
| 2011/0059333 A1* | 3/2011 | Yeh ..................... | H01M 4/0438 |
| | | | 977/773 |
| 2011/0256336 A1* | 10/2011 | Koike ................. | H01M 4/8807 |
| | | | 427/249.4 |
| 2013/0171502 A1 | 7/2013 | Chen et al. | |
| 2016/0012979 A1 | 1/2016 | Zheng | |
| 2016/0126023 A1 | 5/2016 | Cao et al. | |
| 2017/0162874 A1* | 6/2017 | Kobayashi ............. | H01G 11/38 |
| 2017/0301485 A1* | 10/2017 | Cao ......................... | H01G 11/06 |
| 2018/0240608 A1* | 8/2018 | Deng ..................... | H01G 11/38 |
| 2018/0241079 A1 | 8/2018 | Duong et al. | |
| 2018/0297850 A1* | 10/2018 | Tour .................... | H01M 4/0428 |
| 2018/0346337 A1* | 12/2018 | Tour ........................ | B82Y 40/00 |
| 2018/0374656 A1* | 12/2018 | Yan ......................... | H01G 11/34 |
| 2019/0287736 A1 | 9/2019 | Yan et al. | |
| 2020/0002446 A1 | 1/2020 | Sookraj | |
| 2020/0099091 A1* | 3/2020 | Tsuzuki ............ | H01M 10/0569 |
| 2020/0185161 A1 | 6/2020 | Herle | |
| 2020/0227723 A1 | 7/2020 | Wang et al. | |
| 2021/0265634 A1 | 8/2021 | Brambilla et al. | |

FOREIGN PATENT DOCUMENTS

| | | | |
|---|---|---|---|
| KR | 20160085624 A | 7/2016 | |
| WO | 2016043154 A1 | 3/2016 | |
| WO | 2017091474 A1 | 6/2017 | |
| WO | WO-2018102652 A1 * | 6/2018 | ............. H01G 11/24 |
| WO | 2019188759 A1 | 10/2019 | |

OTHER PUBLICATIONS

Written Opinion for International Application No. PCT/US2021/055562; International Filing date Oct. 19, 2021; Report Mail Date Jul. 20, 2022; 7 pages.

Office Action for the corresponding Israel Application No. 302201, Dated: Jul. 21, 2025; 4 pages.

Office Action for the corresponding Korean Application No. 10-2023-7016854, Dated: Jun. 26, 2025; 4 pages (English Translation).

Supplementary European Search Report for the European Application No. 21883679, Date of Mailing: May 12, 2025; 22 pages.

Notice of Allowance for the U.S. Appl. No. 17/538,904, dated Jan. 22, 2026; 8 pages.

* cited by examiner

| | Al foil |
| | Cu foil |
| | Cathode polymer binder-free |
| | Anode polymer binder-free |
| | Ultra-thin Li films having holes |

Li film holes

-- PRIOR ART --

-- PRIOR ART --

Fig. 5A
Fig. 5B
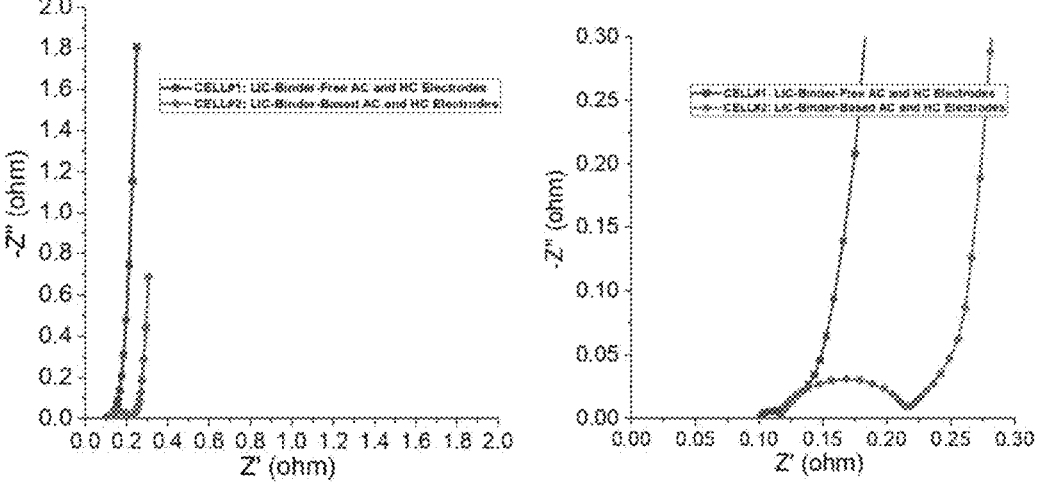
Fig. 6A
Fig. 6B
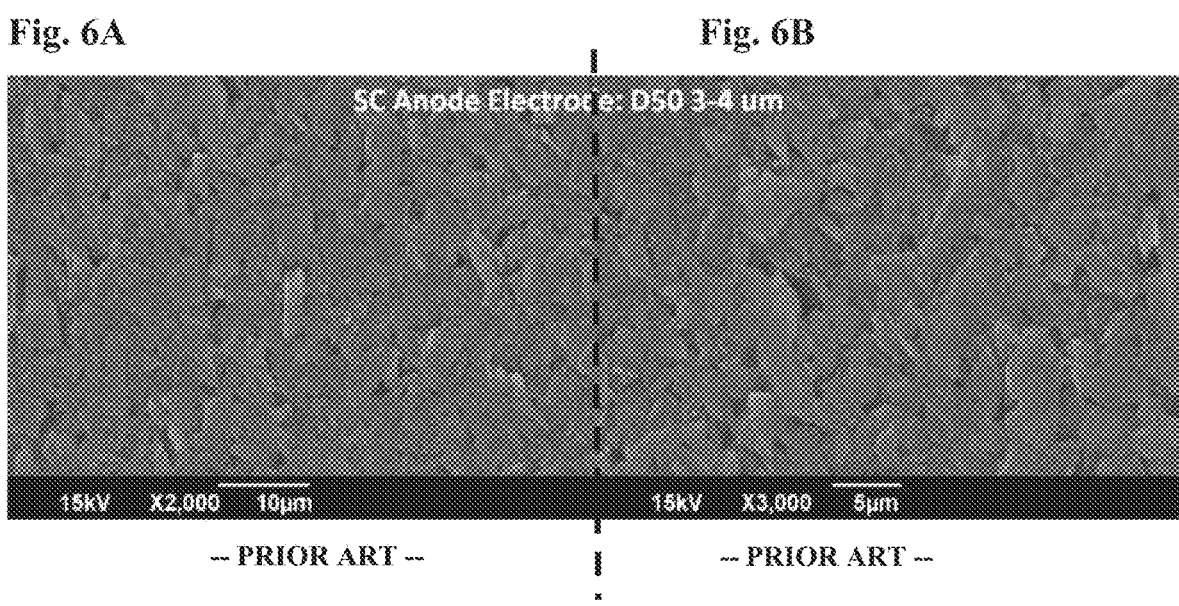
-- PRIOR ART --          -- PRIOR ART --

Fig. 7A                                Fig. 7B

Fig. 9
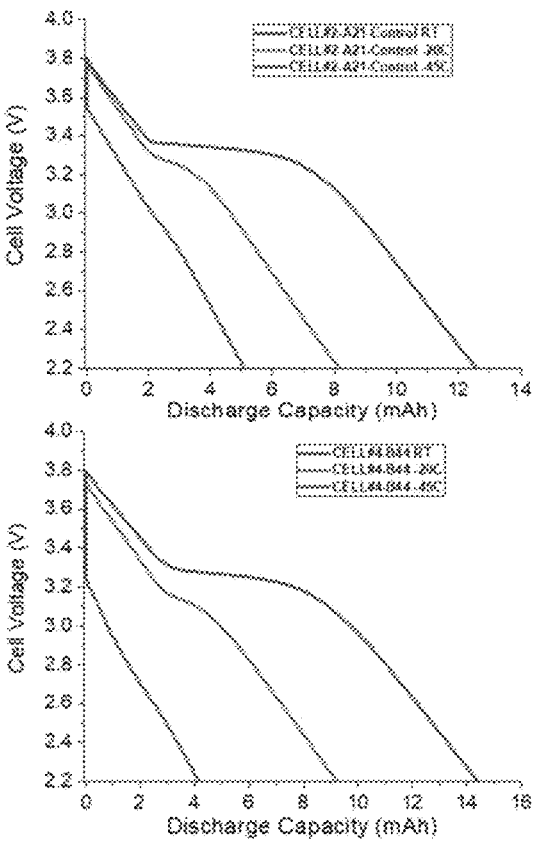
Fig. 10
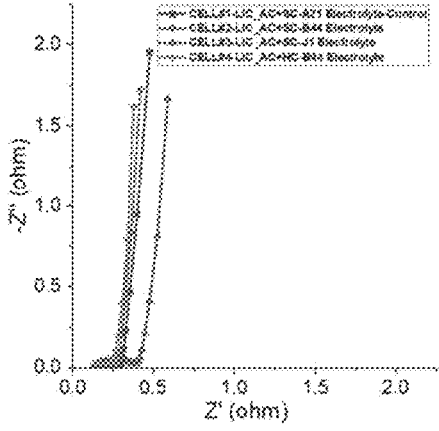
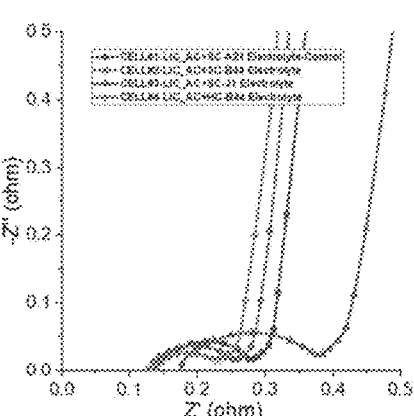

ADVANCED LITHIUM-ION ENERGY STORAGE DEVICE

CROSS REFERENCE TO RELATED APPLICATIONS

This application is a National Stage application of PCT/US2021/055562, filed Oct. 19, 2021, which claims the benefit of U.S. Provisional Application No. 63/093,441, filed Oct. 19, 2020, both of which are incorporated by reference in their entirety herein.

BACKGROUND OF THE INVENTION

1. Field of the Invention

The invention disclosed herein relates to energy storage devices, and in particular to lithium containing electrodes that are fabricated substantially without binder materials.

2. Description of the Related Art

Lithium (Li)-ion battery (LiB) and electric double-layer capacitor (EDLC) are the two widely used electrochemical energy storage devices. A typical LiB is made with a lithium (Li) intercalated anode and a Li metal oxide cathode (hence, the reduction process or faradaic mechanism of energy storage), while the EDLC is made with a high surface area activated carbon (AC) for both anode and cathode (hence, the reliance on double layer capacitance or non-faradaic form of energy storage). As a consequence of their different energy storage mechanisms, these devices are distinct in their energy and power performances. LiB exhibits a high specific energy of, for example, 100-250 Wh/kg; however, LiB also has a low specific power of <0.5 kW/kg and a poor cycle life of <5,000 cycles. EDLC has a high specific power of 10 kW/kg and a long cycle life over 100,000 cycles; however, EDLC exhibit a much lower specific energy of <6 Wh/kg.

Energy storage devices, which can combine the advantages of LiBs and EDLCs in a single form, are highly desirable. As a new generation of supercapacitor, the Li-ion capacitor (LiC) is an advanced energy storage device which includes an EDLC cathode and a pre-lithiated anode, between which ions shuttle during charge and discharge processes. Because of using pre-lithiated and low surface anode materials, the LiC can be charged to a voltage as high as 4.0V, which is much higher than that of EDLCs and comparable to LiBs. Although LiC can achieve a much higher power density than LiB, the energy density of LiC is about 10-20 Wh/kg, which is still much less than LiB. Therefore, the energy density of LiC energy storage device needs to be further improved.

What are needed are methods and apparatus to improve on the promise of LiC technology. Preferably, the methods and apparatus also reduce cost and time required for manufacture.

SUMMARY OF THE INVENTION

In one embodiment, a lithium ion capacitor apparatus is provided. The apparatus includes: a positive electrode including a network of carbon that is substantially free of binder material; a negative electrode including a network of carbon that is substantially free of binder material separated from the positive electrode by a separator; and a film of lithium disposed on the negative electrode to provide for pre-lithiation of the capacitor; wherein at least one of the positive electrode and the negative electrode includes: a network of high aspect ratio carbon elements defining void spaces within the network; a plurality of electrode active material particles disposed in the void spaces within the network and enmeshed in the network.

In some embodiments, the high aspect ratio carbon elements include elements each having two major dimensions and one minor dimension, wherein the ratio of the length of each of the major dimensions is at least 10 times that of the minor dimension. The high aspect ratio carbon elements may include elements each having two major dimensions and one minor dimension, wherein the ratio of the length of each of the major dimensions is at least 100 times that of the minor dimension. The high aspect ratio carbon elements may include elements each having two major dimensions and one minor dimension, wherein the ratio of the length of each of the major dimensions is at least 1,000 times that of the minor dimension. The high aspect ratio carbon elements may include elements each having two major dimensions and one minor dimension, wherein the ratio of the length of each of the major dimensions is at least 10,0000 times that of the minor dimension. The high aspect ratio carbon elements may include elements each having one major dimension and two minor dimension, wherein the ratio of the length of each the major dimension is at least 10 times that of each of the minor dimensions. The high aspect ratio carbon elements may include elements each having one major dimension and two minor dimension, wherein the ratio of the length of each the major dimension is at least 100 times that of each of the minor dimensions. The high aspect ratio carbon elements may include elements each having one major dimension and two minor dimension, wherein the ratio of the length of each the major dimension is at least 1,000 times that of each of the minor dimensions. The high aspect ratio carbon elements may include elements each having one major dimension and two minor dimension, wherein the ratio of the length of each the major dimension is at least 10,000 times that of each of the minor dimensions. The high aspect ratio carbon elements may include carbon nanotubes or carbon nanotube bundles. The high aspect ratio carbon elements may include graphene flakes. The electrode active layer may contain less than 10% by weight polymeric binders disposed in the void spaces. The electrode active layer may contain less than 1% by weight polymeric binders disposed in the void spaces. The electrode active layer may contain less than 1% by weight polymeric binders disposed in the void spaces. The electrode active layer may be substantially free of polymeric material other than the surface treatment. The electrode active layer may be substantially free of polymeric material. The network may be at least 90% carbon by weight. The network may be at least 95% carbon by weight. The network may be at least 99% carbon by weight. The network may be at least 99.9% carbon by weight. The network may include an electrically interconnected network of carbon elements exhibiting connectivity above a percolation threshold. The network may define one or more highly electrically conductive pathways. The pathways may have a length greater than 100 μm. The pathways may have a length greater than 1,000 μm. The pathways may have a length greater than 10,000 μm. The network may include one or more structures formed of the carbon elements, said structure including an overall length at least ten times the length of a largest dimension the carbon elements. The network may include one or more structures formed of the carbon elements, said structure including an overall length at least 100 times the length of a largest dimension the carbon elements. The network may include one or more structures formed of the carbon elements, said structure including an overall length at least 1,000 times the length of a largest dimension the carbon elements. The positive electrode may include electrode active material including at least one from the list consisting of: activated carbon, carbon black, graphite, hard carbon, soft carbon, nanoform carbon, high aspect ratio carbon, and mixtures thereof. The positive electrode may include electrode active material including activated carbon (AC) having a specific surface area in a range from 1000 to 3000 $m^2$/g. The positive electrode may include electrode active material including activated carbon (AC) having a particle size D50≤10 μm. The negative electrode may include electrode active material having a particle size D50≤10 μm. The positive electrode may include electrode active material including activated carbon (AC), carbon black (BC) and high aspect ratio carbon, wherein the mass ratio between the active material and the high aspect ratio carbon is in the range of from 80:20 to 99:1. The total combined thickness of the positive electrode and the film of lithium may be in the range of 40 μm to 450 μm. The total thickness of the negative electrode may be in the range of 20 μm to 350 μm. The thickness ratio of the total thickness of the positive electrode active layer to the total thickness of the negative electrode active layer may be in the range of 1:2 to 3:1. The capacity ratio of the positive electrode active layers to the negative electrode active layers is in the range of 1:12 to 1:2. The lithium film may include an ultra thin lithium film including holes. The mass per unit area of the lithium sources on a side of the negative active layer may be in the range of 0.1 mg/cm2 to 3 mg/cm$^2$. Thickness of the lithium sources on a side of the negative active electrode layer may be in the range of 2 to 50 μm. Surface area of the lithium film may be about 25% to about 100% of the surface area of a side of the negative electrode. The lithium film may include holes, and wherein the area size percentage range of said holes is in the range of about 0.01% to about 75% of the total area of the film.

In another embodiment, a method for fabrication of a lithium ion capacitor is provided. The method includes providing an energy storage cell by selecting a positive electrode including a network of carbon that is substantially free of binder material; selecting a negative electrode including a network of carbon that is substantially free of binder material separated from the positive electrode by a separator; and disposing a film of lithium on the negative electrode to provide for pre-lithiation of the capacitor; sealing the energy storage cell and electrolyte in a housing to provide the capacitor. The lithium ion capacitor may include the apparatus described above.

BRIEF DESCRIPTION OF THE DRAWINGS

The features and advantages of the invention are apparent from the following description taken in conjunction with the accompanying drawings in which:

A series of micrographs, flow charts and performance graphics are provided.

FIG. 2A depicts cathode materials including activated carbon;

FIG. 2B another depiction of cathode materials that include activated carbon:

FIG. 5A is a graph that depicts a Z" versus Z' for an inventive energy storage device versus a comparative ESR:

FIG. 5B is an exploded view of the curves presented in FIG. 5A;

FIG. 6A is a micrograph of the soft carbon based electrode;

FIG. 6B is a micrograph of the soft carbon based electrode:

FIG. 7A is a micrograph of the AC and LFP binder-free electrode;

FIG. 7B is a micrograph of the AC and LFP binder-free electrode;

FIG. 9 depicts results for low temperature tests;

FIG. 10 provides a comparison performance for the soft carbon and hard carbon anodes;

DETAILED DESCRIPTION OF THE INVENTION

Disclosed herein are methods and apparatus for fabrication of hybrid, binder-free electrodes useful in energy storage devices. Advantageously, as a result of being substantially free of binder materials conventionally used in construction of electrodes, the electrodes disclosed herein are capable of delivering superior electrical performance and require fewer steps in the manufacturing process.

Energy storage devices disclosed herein combine the advantages of LiB and LiC while avoiding inherent defects, thus bridging the gap between the high energy densities offered by LiBs and the high-power densities exhibited in LiCs. Among other things, a fundamental difference between this Li-ion energy storage device and the LiC is that the hybrid Li-ion technology integrates two separate energy storage devices into one by synergistically combining LiB and LiC cathode materials together to form a hybrid composite cathode. The non-faradaic capacitor material may be initially charged electrostatically until the potential of the electrode reaches the reduction reaction potential of the faradaic battery material, when the battery material is charged while maintaining a constant battery reduction reaction potential. Once fully charged, the capacitor material is charged again until a limiting potential is reached for the capacitor material.

In general, the technology disclosed is directed to a hybrid lithium-ion energy storage device that includes a hybrid composite binder-free cathode electrode, a binder-free anode electrode, a separator and an organic solvent electrolytic solution with lithium salt as the electrolyte, and ultra-thin lithium film (μ-Li) sources. The ultra-thin lithium film may include a plurality of holes. By way of the ultra-thin lithium film, the anode electrode is pre-doped with sufficient lithium ions. Pre-doping may occur by placing the ultra-thin lithium film substantially on the surface of anode electrode. Additionally, the hybrid composite cathode may be fabricated using a polymer binder-free manufacturing process, a resulting capacity ratio of the hybrid composite cathode to anode electrode may be from 0.1 to 1.2. Mass of the ultra-thin lithium film disposed on the anode electrode may be pre-determined by a calculation formula to achieve high energy, power and long-term cycle life performance in full cell format design.

Figure 1:
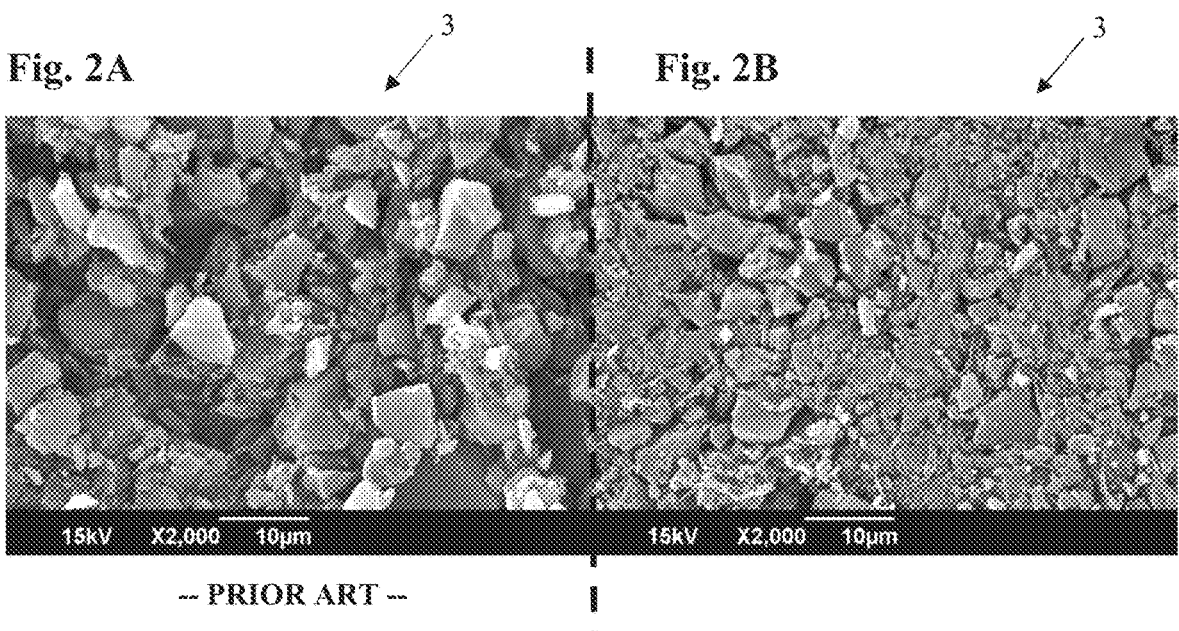
FIG. 1 is a depiction of an energy storage device (ESD)

A schematic diagram of the energy storage device is depicted in FIG. 1. In the example of FIG. 1, the energy storage device (ESD) 10 is a three-layer cell. Opposing current collectors 2 are host to cathode materials 3. Collectively, the current collectors 2 and cathode materials 3 provide for each of the two cathodes 4 shown. Shown disposed between the cathodes 3 is an anode 8. In this example, the anode 8 includes opposing layers of anode materials 5 disposed on another current collector 6. Disposed over each layer of anode materials is a lithium source 7. In this example, the current collector 2 for the cathode is fabricated from aluminum, the current collector 6 for the anode is fabricated from copper.

Referring to FIGS. 2A and 2B, examples of cathode materials 3 including activated carbon are shown. In these illustrations, SEM images of cathode materials 3 in the prior art (FIG. 2A) and according to the teachings herein (FIG. 2B) are shown. As may be seen, the image for the cathode 4 disclosed herein includes substantially more carbon, and as one might readily surmise, is capable of greater energy storage than the device of FIG. 2A.

For purposes of discussion, two examples of cathode materials are presented herein. A first example includes an electrode with pure activated carbon (AC) (LiC with 0% lithium iron phosphate (LFP)); the second example includes hybrid binder-free electrodes (with a ration of LFP to AC of 20:80). In the binder-free electrodes, the carbon structure provided results in excellent bonding with active materials and serves to bind the cathode together without the need for conventional polymeric or similar non-conductive or poorly conductive binders. As a result of being (non-conductive) binder-free, the carbon structure results in higher conductivity and higher cell performance. In this disclosure, commercially available dry method AC binder-based electrodes are used as a baseline for the comparison.

Generally, binder materials are non-conductive or poorly conductive materials added to electrode materials in order to promote mechanical integrity of the electrode layer and good adhesion to the current collector. Use of binder materials displaces other materials capable of energy storage and conduction, thus reducing output of the energy storage cell in which they are used. One example of a binder is PVDF. Polyvinylidene fluoride (PVDF) is a highly non-reactive thermoplastic fluoropolymer produced by the polymerization of vinylidene difluoride. PVDF is commonly used in cathodes. A common anodic binder material is styrene-butadiene copolymer.

Figures 3A, 3B, 3C:
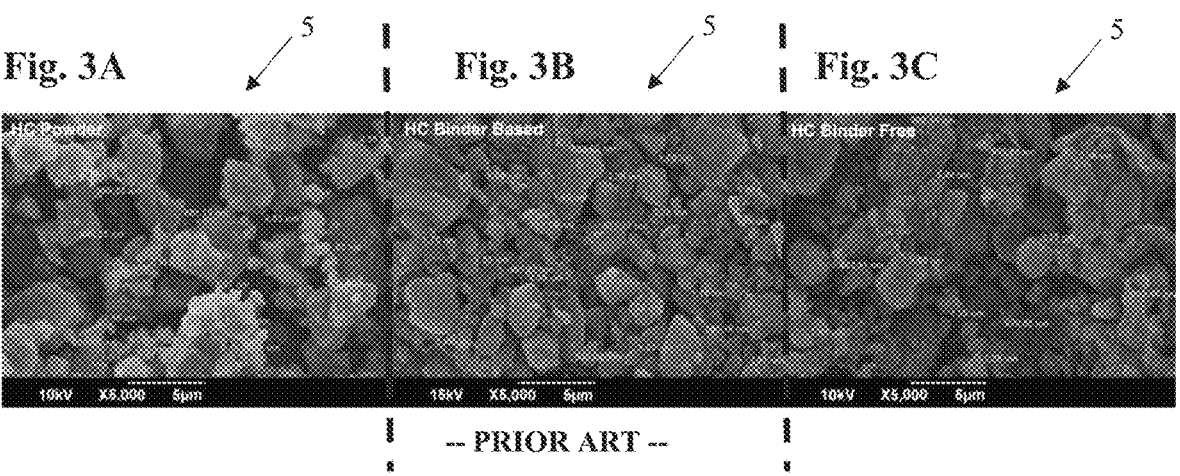
FIG. 3A is an SEM of hard carbon powder.
FIG. 3B is an SEM of hard carbon powder.
FIG. 3C is an SEM of hard carbon powder.

Similarly, in FIGS. 3A, 3B and 3C, anode materials 5 are shown. In FIG. 3A, an SEM of hard carbon powder is presented. In FIG. 3B, a prior art anode 8 fabricated from hard carbon powder and binder materials is shown. In FIG. 3C, aspects of an anode 8 according to the teachings herein are shown.

For purposes of discussion, the anode 8 presented herein consisted of hard carbon (HC) as the active material. A slurry mixture for the anode was made and included HC with a particle size (D50) of 2 μm and carbon nanotubes with carboxymethyl cellulose (CNT and CMC) functional as binder materials. In this example, the mass ratio of the three components was 98.33:0.67:1. After the slurry was prepared, it was coated onto a copper (Cu) foil substrate that had a thickness of 10 μm. Then the electrodes were dried at 160 degrees Celsius for three hours in oven with flowing air. The anode electrodes sheets with single-side active material layer thickness of approximately 75 μm and tap density of 1.0 g/cm$^3$ were fabricated. The porosity of the hard carbon anode was about 50 percent. The electrodes were then punched from the electrode sheets to the desired dimensions 4.6 cm×4.6 cm (active area) for anodes and 4.5 cm×4.5 cm for cathodes, then vacuum dried at 120 degrees Celsius overnight and transferred to dry room environment before final cell assembly there. The electrodes were assembled into the configuration depicted in FIG. 1.

In assembly of the ESD 10, the lithium source 7 was incorporated for all anodes 8. In each embodiment, the lithium source 7 included ultra-thin lithium film with holes therein. The holes were cut from a 20 μm Li-metal sheets (99.9% purity). The lithium source 7 provided a source of lithium for pre-lithiation, with various size to fabricate various LFP/AC hybrid composite cathode-based LiB/LiC cells. Based on the HC anode first lithium intercalation specific capacity which was about 372 mAh/g, the amount of u-Li having holes pre-loaded onto the surface of the HC anode to fully pre-lithiate HC was determined to be ~10% (u-Li pre-loaded mass/anode active layer mass). In the cell design for the LiC (0% LFP), it was determined the anode should be pre-lithiated (with about 10% lithium loading) since the capacity ratio of cathode to anode is about 0.14 (1:7). This LiC cell design enables the LiC to have a long cycle and high energy and power densities. However, when there is LFP mixed in the hybrid composite binder-free cathode, LFP will provide an additional lithium source from the hybrid cathode when charging to the maximum operating voltage. In order to avoid growth of lithium dendrites in the anode during charging of the cell, the actual mass loading for the lithium source 7 (i.e., the ultra-thin lithium film having holes) that is disposed on the surface of anode should take into account the lithium source portion provided from LFP in the hybrid cathode, and therefore should be less than 10% of the anode active layer weight. It can be concluded that reductions in the lithium source 7 at the anode should be correlated to increases of LFP in the cathode.

Figure 4:
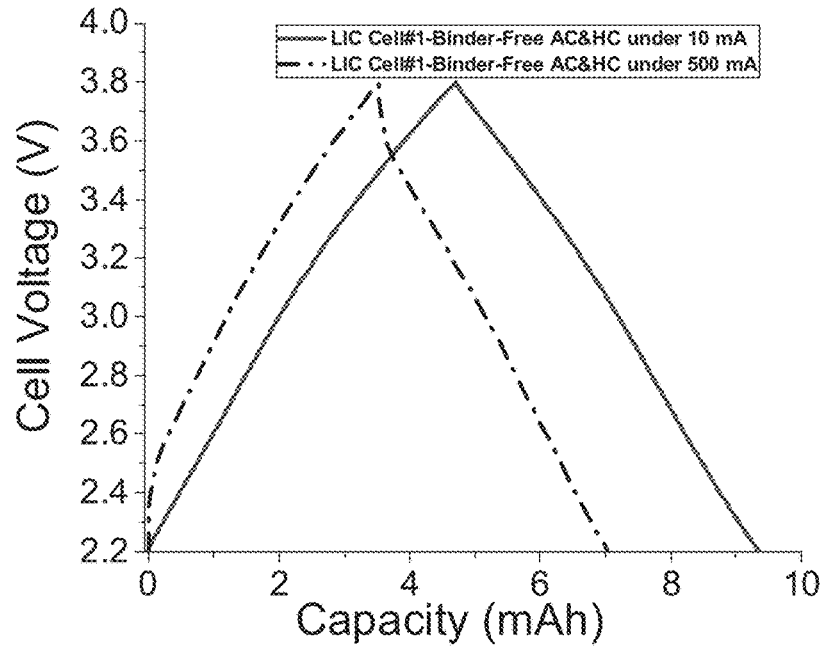
FIG. 4 depicts a charge/discharge profile collected during initial testing.

During cell assembly, loading of the lithium source 7 was performed in a dry room environment. The ultra-thin lithium film was placed with application of pressure. In examples of the ESD 10 that were assembled, the scheme shown in FIG. 1 was followed. The anode was a double-sided HC anode pre-loaded with the lithium source having holes and between two single side LFP/AC composite cathodes. Electrolyte used was 1 M LiPF6 in 1:1 by weight mixture of ethylene carbonate (EC) and dimethyl carbonate (DMC). All pouch cell assembly was performed in dry room environment (−40° C. Dew Point). FIG. 4 depicts a charge/discharge profile collected during initial testing.

FIG. 4 shows initial test results of LiCs with binder-free AC and HC electrodes under different current charge and discharge. Test conditions for these examples included: cathode porosity of 83.1%; anode porosity of 64.1%. Cell voltage ranged between 3.8-2.2 V; capacitance was 11.2 F; ESR was 0.127 ohm and the RC constant was 1.4 seconds. Specific Energy and Energy Density based on cathode and anode active layers weights and volumes were determined as 36.6 Wh/kg and 20.1 Wh/L, respectively. Maximum Specific Power and Power Density based on cathode and anode active layer weights and volumes were determined to be 69.7 kW/kg and 35.3 kW/L, respectively.

It is estimated from the results that for this cell design, the specific energy and energy density with a full size multi-layer 1000F LiC pouch cell can be 9 Wh/kg and 16 Wh/L, which are substantially higher than competitive 1000F LIC energy density (13.7 Wh/L). Additionally, it is estimated that for this cell design, the ESR with a full size multi-layer 1000F LIC pouch cell can be 1.4 mohm, which is smaller than ESR for competitive 1000F LIC cells (1.6 mohm). Table 1 below provides a more detailed comparison to prior art technology.

TABLE 1

| Cell Name | OCV After Vaccum Seal (V) | C (10 mA) (F) | ESR/ Internal Resistance (500 mA, 1 ms pulse) (ohm) | AC Cathode Specific Capacitance (F/g) | RC Constant | Max. Specific Power based on Active Layer Mass (kW/kg) | Max. Power Density based on Active Layer Volume (kW/L) |
|---|---|---|---|---|---|---|---|
| LIC CELL#1 Binder-Free AC & HC | 2.936 | 11.2 | 0.127 | 103.6 | 1.4 | 69.7 | 36.7 |
| LIC CELL#2 Dry Method AC Binder-Based HC | 3.065 | 27.9 | 0.183 | 116.0 | 5.1 | 30.1 | 22.3 |

As may be seen from the comparison in Table 1, ESR for a binder-free electrode based LiC was 30.6% less than a binder-based (i.e., prior art) control sample. Similarly, the RC constant for the LiC with binder-free electrodes was only 1.4 seconds while the binder-based LiC had a RC constant of 5.1 seconds. The maximum specific power and power density of the LiC that was based on binder-free electrodes was 131.6 percent and 64.6 percent higher, respectively, than the binder-based (i.e., prior art) control sample. FIG. 5A depicts comparative ESR, with FIG. 5B being an exploded view of the curves presented in FIG. 5A. Aspects of a second embodiment tested are introduced in FIGS. 6A, 6B, 7A and 7B.

Figure 8:
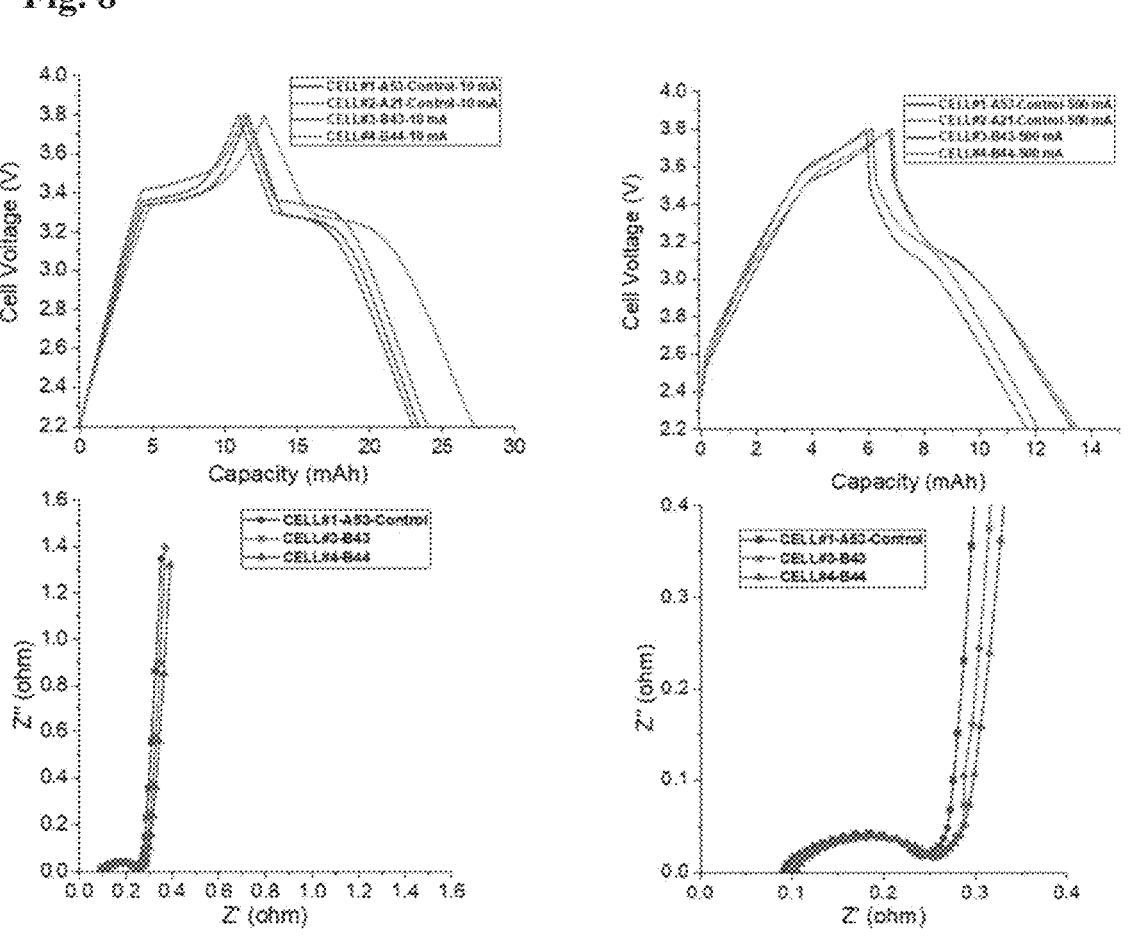
FIG. 8 depicts charge/discharge performance of the four cells.

In the second embodiment, soft carbon and AC and LFP binder-free electrodes were used to study comparative performance. The ratio of SC:CNT:CMC was the same as HC slurry, and this time 20 percent LFP were added into carbon framework with activated carbon (AC) to achieve hybrid composite electrode. FIGS. 6A and 6B are micrographs of the soft carbon based electrode. FIGS. 7A and 7B are micrographs of the AC and LFP binder-free electrode. Assembly of the storage cell followed the same procedure as with the first embodiment outlined above. Physical aspects of the storage cells are set forth in Table 2.

without binder are identified as B43 and B44. Electrolyte used in the storage cells was: A53: 1.0M $LiPF_6$ in EC/DMC+ 1% VC; A21: 1.0M $LiPF_6$ in EC/EMC/MB (20:20:60 by Vol)+0.1M LiDFOB; B43: 1.0M LiFSI in EC/EMC/DEC/PC (20:46.7:23.3:10 by Vol)+1% VC; and B44: 1.0M LiFSI in EC/EB/DEC/PC (20:46.7:23.3:10 by Vol)+1% VC. Initial charge-discharge profiles for the storage cells was 0.25 and 12.5 mA/cm2 (10 & 500 mA). FIG. 8 depicts charge/discharge performance of the four cells. This includes initial galvanostatic charge-discharge along with ESR results.

FIG. 9 depicts results for low temperature tests. As A53 was not operable under –45 degrees Celsius, A53 was not included in the charge-discharge testing. In the tests, A21 showed the highest capacity retention under minus 45 degrees Celsius: about 40 percent. B44 showed the second highest capacity retention under minus 45 degrees Celsius: about 30 percent. Based on cell design, the specific energy of LIC is about 22.4 Wh/kg, 30 percent retention will be 6.7 Wh/kg, which is still maintaining half of the original design 13 Wh/kg. The additive of LFP appeared to lower the capacity retention for the low temperature tests. FIG. 10 provides a comparison performance for the soft carbon and hard carbon anodes. In FIG. 10, it may be seen that B44

TABLE 2

| Cell Name | Cathode#1 Active Layer Thickness (µm) | Cathode#2 Active Layer Thickness (µm) | Total Cathode Active Layer Mass (g) | Total Cathode Active Layer Press Density (g/cm3) | Cathode Mass Loading (mg/cm2) | Cathode Porosity, % | Anode Active Layer DS Thickness (µm) | Anode Active Layer Mass (g) | Anode Active Layer Press Density (g/cm3) | Anode Mass Loading (mg/cm2) | Anode Porosity, % |
|---|---|---|---|---|---|---|---|---|---|---|---|
| CELL#1-A53-Control | 100 | 100 | 0.1905 | 0.470 | 4.7 | 77.8% | 150 | 0.3398 | 1.08 | 8.0 | 43.1% |
| CELL#2-A21-Control | 97 | 99 | 0.19 | 0.479 | 4.7 | 77.4% | 126 | 0.2825 | 1.07 | 6.7 | 43.6% |
| CELL#3-B43 | 114 | 86 | 0.1921 | 0.474 | 4.7 | 77.6% | 147 | 0.3207 | 1.04 | 7.6 | 45.2% |
| CELL#4-B44 | 124 | 118 | 0.2189 | 0.447 | 5.4 | 78.9% | 152 | 0.3308 | 1.04 | 7.8 | 45.3% |

| Cell Name | Cathode/ Anode Capacity Ratio | Li/ Anode Active Layer, % | C (10 mA) (F) | ESR/ Internal Resistance (500 mA, 1 ms pulse) (ohm) | RC Constant |
|---|---|---|---|---|---|
| CELL#1-A53-Control | 0.14 | 8.27% | 26.4 | 0.145 | 3.8 |
| CELL#2-A21-Control | 0.17 | 11.19% | 28.3 | 0.167 | 4.7 |
| CELL#3-B43 | 0.15 | 9.35% | 27.1 | 0.187 | 5.1 |
| CELL#4-B44 | 0.17 | 9.31% | 32.5 | 0.187 | 6.1 |

In Table 2, the control cells (i.e., prior art soft carbon) are identified as A53 and A21. The storage cells fabricated shows the best impedance compared with other two electrolyte. For EIS, the hard carbon anodes performed slightly better than soft carbon anodes for LICs as shown by the smaller semi-circle in the graph.

A third embodiment was directed to optimization of electrolyte formulations for both high and low temperatures. In this embodiment, Y4 was the electrolyte control sample: 1.0M LiTFSI, EC/EMC/MB (20:20:60 by volume)+1 percent VC. Y5 and Y5.1 were BCN solvent based electrolyte with LiTFSI salt with additives including VC, FEC, LiDFOB, LiBOB, LiDFOP, LiNO$_3$. The electrolyte formulation for Y5 was: 1.0M LiTFSI in BCN/EC/VC (80/10/10 by volume); Y5.1 electrolyte formulation was: 1.0M LiTFSI in BCN/EC/VC (80/10/10 by volume)+1% OS$_3$, a commercially available additive.

Figure 11:
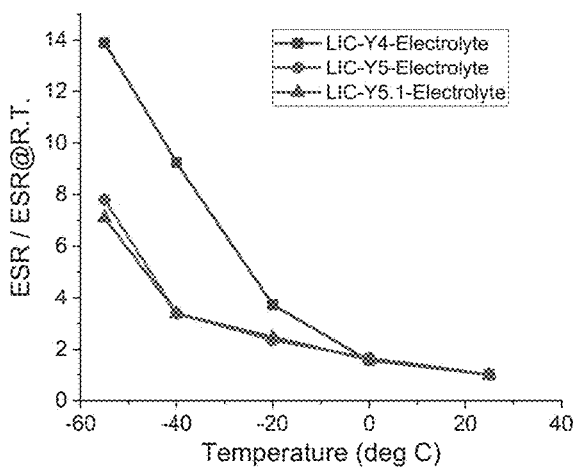
FIG. 11 is a graph depicting ESR performance as a function of temperature for three different kinds of electrolytes.
Figure 12:
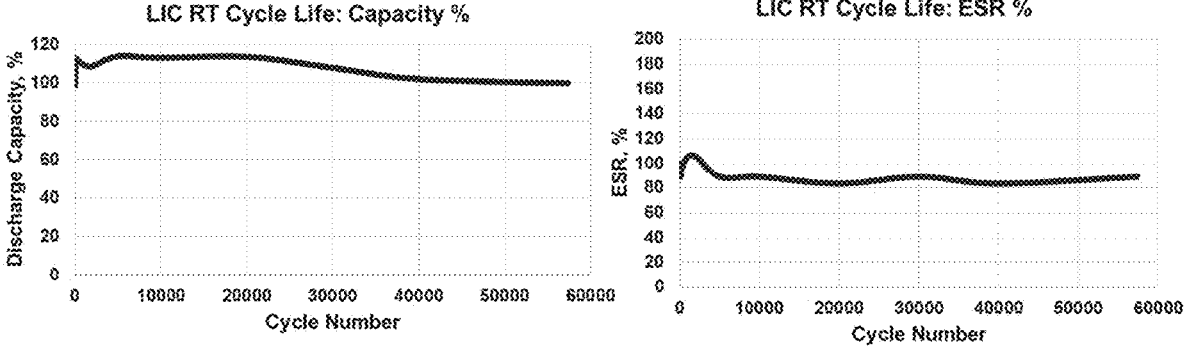
FIG. 12 represents graphs that depict capacity percentage and ESR % as a function of the number of cycles.

FIG. 11 is a graph depicting ESR performance as a function of temperature for three different kinds of electrolytes. Under a low temp minus 40 degrees Celsius, it was found that binder-free LIC has a 3.4 ohm ESR increase, while conventional binder-based LIC has a 5.1 ohm ESR increase. With Y5 electrolyte, the cell also passed long term cycle life testing and results can be found in FIG. 12. In FIG. 12, room temperature high C-rate cycle life test for LICs with electrolytes: Y5; voltage range is from 3.8-2.2V and the current is about 500 mA.

Figure 13:
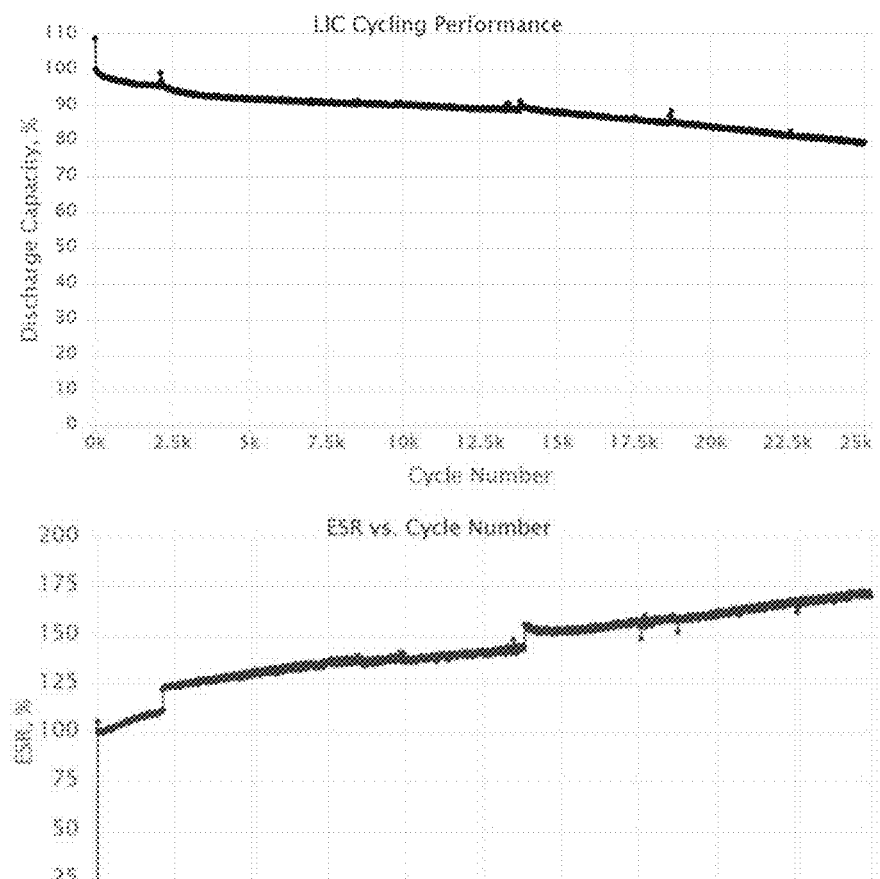
FIG. 13 depicts a cycle life performance plot of cells with Y7 electrolyte charge-discharged from 3.8V-2.2V under a constant current 500 mA, capacitance/ESR retention as a function of cycle number. cycling environment is 85 degrees Celsius.
Figure 14:
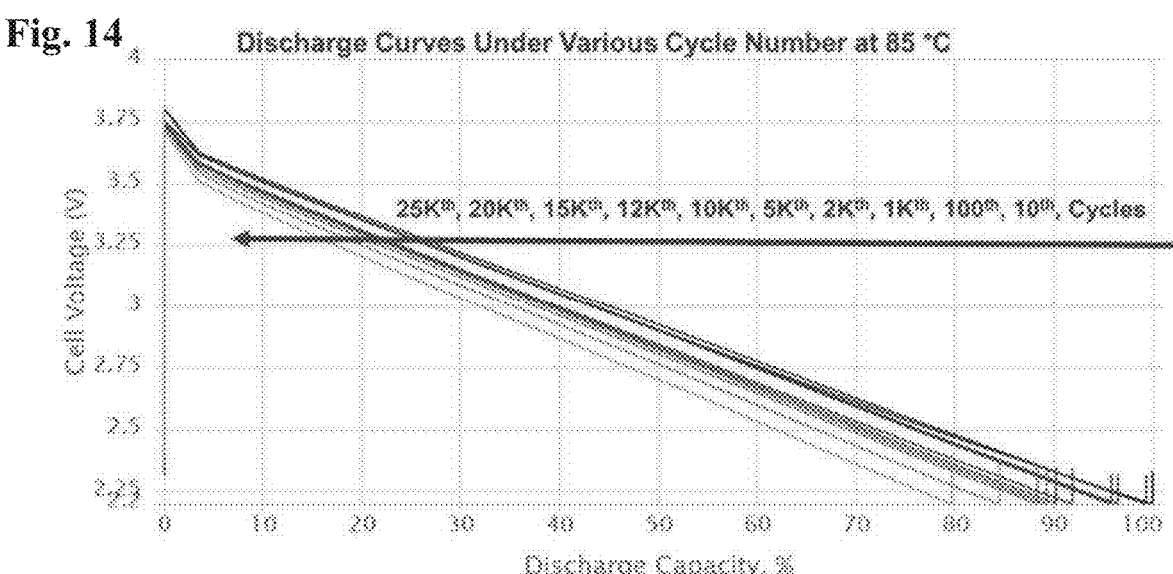
FIG. 14 presents discharge curves under various cycle number when LIC cycling at 85 degrees Celsius based on Y7 electrolyte.
Figure 15:
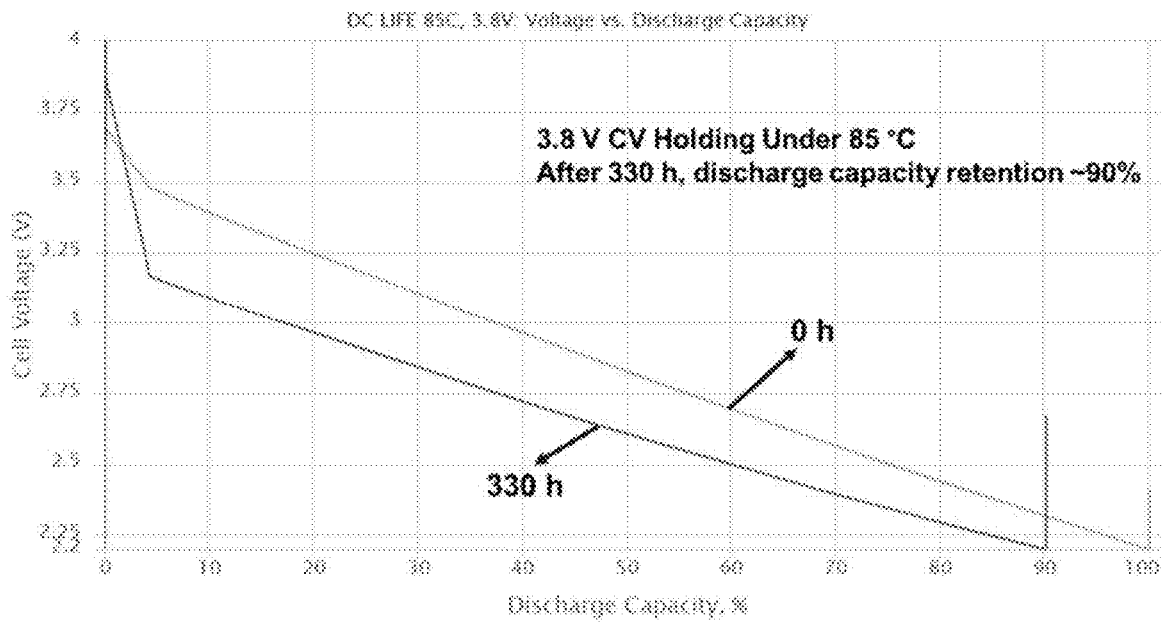
FIG. 15 shows a discharge curve comparison after holding constant voltage at 3.8V (float test) under 85 degrees Celsius before and after 330 hours.

In a fourth embodiment, performance of both high (85 degrees Celsius) and low (minus 55 degrees Celsius) temperature electrolyte formulations was evaluated. Y7 was assigned to BCN solvent based electrolyte with LiTFSI salt with co-solvents including GBL (gamma-Butyrolactone), VC, FEC, and additives including LiDFOB, LiBOB, LiD-FOP, LiNO$_3$ etc. Y7 electrolyte formulation is: 1.0 M LiTFSI in BCN/GBLNC/OS$_3$ (74.5/12.5/10/3 by volume). FIGS. 13-15 depict the high temp cycling and direct charge results of LICs with Y7 electrolyte. Y7 has the same minus 55 degrees Celsius low temperature performance as Y5 and Y5.1. FIG. 13 depicts a cycle life performance plot of cells with Y7 electrolyte charge-discharged from 3.8V-2.2V under a constant current 500 mA, capacitance/ESR retention as a function of cycle number, cycling environment is 85 degrees Celsius. FIG. 14 presents discharge curves under various cycle number when LIC cycling at 85 degrees Celsius based on Y7 electrolyte. FIG. 15 shows a discharge curve comparison after holding constant voltage at 3.8V (float test) under 85 degrees Celsius before and after 330 h.

Figure 16:
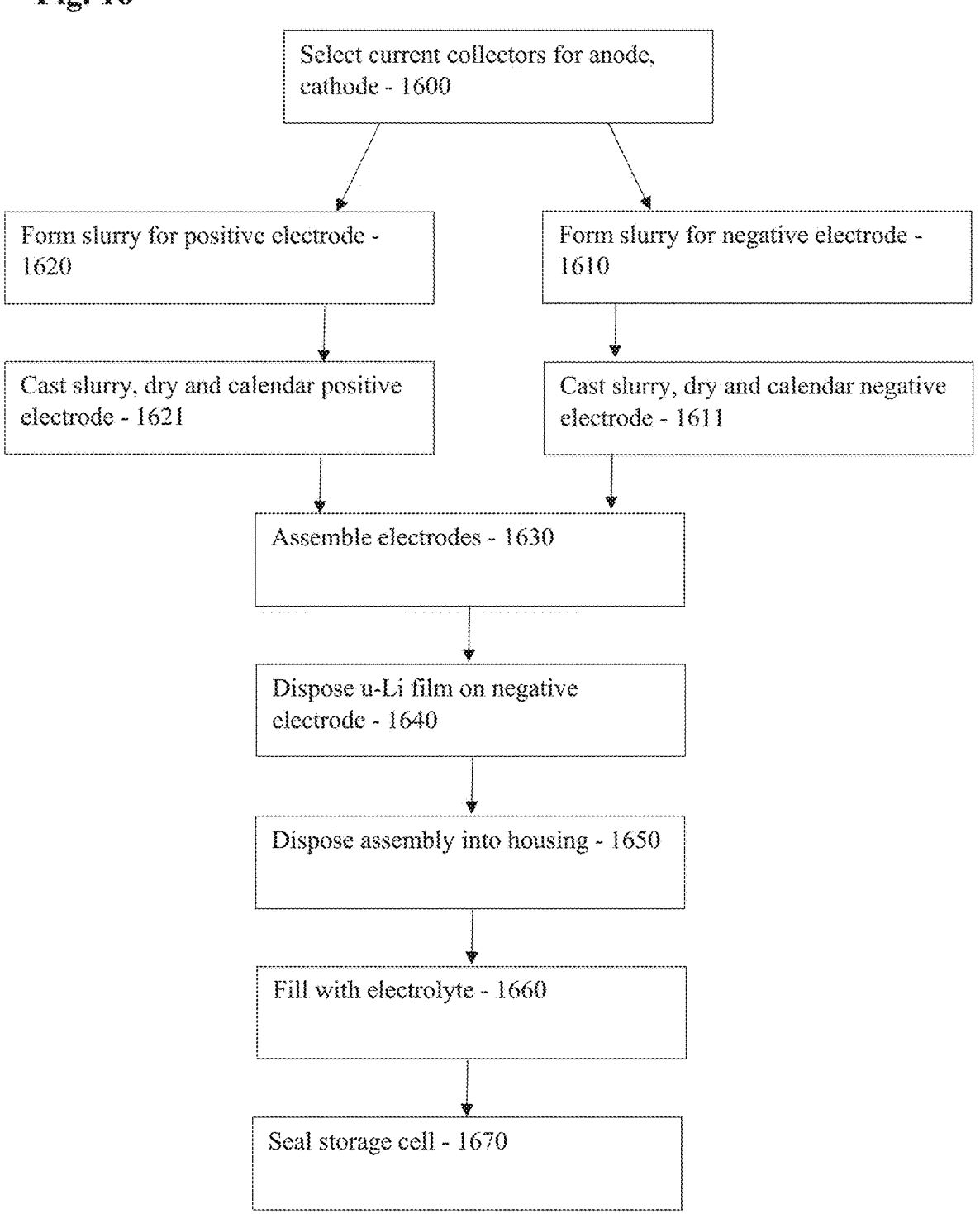
FIG. 16 details a method of fabrication of a storage cell according to the teachings herein.

A method of fabrication of a storage cell according to the teachings herein is provided in FIG. 16.

In some embodiments, the positive electrode used is an electrode including a sheet-shaped metal current collector with double-side coated conductive material and electrode layers composed of the positive electrode active material and CNTs, and formed on both surfaces of the current collector. The negative electrode used in this LIC laminate cell is an electrode including a sheet-shaped metal current collector with double-side coated conductive material and electrode layers composed of the negative electrode active material and the additives, and formed on both surfaces of the current collector.

The current collector used in the positive electrode may be made from aluminum, stainless steel or other materials. In some of the examples presented, aluminum is used. The current collector used in the negative electrode can be made up by stainless steel, copper, nickel etc. In some of the examples presented, copper is used. Generally, thicknesses of the current collectors in positive and negative electrodes are within a range of about 5 to 50 µm. In examples presented, the range is between 8 to 25 µm. This range enables that the positive and negative electrodes obtained have high strength and it is easy for the conductive coating material slurry to be applied. The conductive material coating accuracy, and the volumetric energy density and gravimetric energy density can be improved. Both surfaces of the positive and negative current collectors were coated with carbon conductive coating slurry by a spraying/coating method and dried thereby to obtain the current collectors that have a conductive layer for both positive and negative electrodes. The carbon conductive coating thickness on one side of the current collector is 1 to 20 µm. In examples presented, the thickness ranged between 3 to 12 µm.

The positive and negative electrodes may be made of the electrode active material mentioned above. Specifically, a positive/negative electrode active material powder, CNTs and some solvent are dispersed into the blender/mixer to be mixed to obtain a wet slurry mixture. The percentage of the additives added in the powder/slurry mixture is preferred to be 2 percent to 12 percent. For positive electrode fabrication, the slurry may be made without binder. Then the slurry mixture is then coated on to the substrates which are the positive electrode active material layers. The thickness of the positive electrode active layer is 30 to 250 µm or in some embodiments, 50 to 200 µm. The binder-free electrodes are then calendered by high temperature hot mill rollers to form the final positive electrodes for the LIC cells with desired porosity and press densities. The positive electrode active material, the additives and de-ion water/IPA as solvent are mixed for enough time in the mixer first to form uniform wet slurry. Then the slurry is coated onto the both sides of the carbon conductive pre-coated current collector by electrode coating machine with drying oven attached so that the coated electrodes can be dried. The gap of the coating machine may be adjusted according to the initial thickness requirement of electrode fabrication. Then the dried electrodes are pressed down into desire active layer thickness through a hot press calendar to form the final positive electrodes for the LIC cells. The thickness of positive electrode active layer based on wet slurry fabrication method on one side of the current collector is 3 to 250 µm, in some embodiments, 5 to 200 µm.

The negative electrode active material, the CNT/CMC additives and de-ion water as solvent are mixed for enough time in the mixer first to form uniform wet slurry. Then the slurry is coated onto the both sides of the carbon conductive pre-coated current collector by electrode coating machine with drying oven attached so that the coated electrodes can be dried. The gap of the coating machine may be adjusted according to the initial thickness requirement of electrode fabrication. Then the dried electrodes are pressed down into desire active layer thickness through a hot press calendar to form the final negative electrodes for the LIC cells. The thickness of negative electrode active layer based on wet slurry fabrication method on one side of the current collector is 3 to 200 µm, in some embodiments, 5 to 160 µm is used.

In some embodiments of the LiC cell presented herein, the total thickness of the positive electrode, which includes the thickness of double-side conductive material pre-coated current collector and the thickness of the double-side active layers, and may be 40 µm to 450 µm. In some embodiments of the LiC cell presented herein, the total thickness of the negative electrode, which includes the thickness of double-side conductive material pre-coated current collector and the thickness of the double-side active material layers and may be 20 µm to 350 µm. In some embodiments of the LiC cell presented herein, the thickness ratio of the total thickness of the positive electrode active layers to the total thickness of the negative electrode active layers may be from 1:2 to 3:1.

Generally, the positive electrode used is an electrode including a sheet-shaped metal current collector with double-side coated conductive material and electrode layers composed of the positive electrode active material and CNTs, and formed on both surfaces of the current collector. The negative electrode used in the LIC laminate cell of present invention is an electrode including a sheet-shaped metal current collector with double-side coated conductive material and electrode layers composed of the negative electrode active material and the additives, and formed on both surfaces of the current collector.

Generally, the Li source pre-loaded on surface of negative electrodes is ultra-thin Li films having holes. The ultra-thin Li films having holes are applied onto the surface of all the prefabricated negative electrodes by manufacturing method of laminating the negative electrodes with top and bottom ultra-thin Li films having holes which is described in detail in U.S. patent application Ser. No. 15/489,813, which is incorporated herein by reference in it's entirety. Manufacturing may be in a dry room which has a dew point lower than −45° C. The pressure of lamination rolls may be 40 kg/cm² to 400 kg/cm². In some embodiments of the LiC cell presented herein, the mass per unit area of the ultra-thin Li films having holes loaded onto one side surface of the negative electrode is preferred to be 0.1 mg/cm² to 3 mg/cm². The thickness of ultra-thin Li films having holes pre-loaded on one side surface of negative electrode is preferred to be 2 to 50 μm. The length of the ultra-thin Li films having holes as Li source loaded on surface of negative electrode may be 30 mm to 250 mm and the width of said ultra-thin Li films having holes as Li source loaded on surface of negative electrode may be 30 mm to 150 mm. The area of the ultra-thin Li films having holes as Li source loaded on surface of negative electrode may be about 25% to about 100% of the area of the negative electrode. The area size percentage range of said holes in said ultra-thin Li films having holes as Li source loaded on surface of negative electrode may be from about 0.01% to about 75%. The mass ratio percentage of the ultra-thin Li films having holes pre-loaded onto both side surfaces of the negative electrode to the both side negative electrode active layers is preferred to be 7% to 14%. After all the ultra-thin Li films having holes are pressed onto the negative electrode, there may be a uniform thin layer Li source location distribution on the surface of the negative electrode.

In some embodiments of the LiC cell presented herein, the electrodes including the positive electrodes and negative electrodes with lithium sources pre-loaded on surface are punched into designated size with some additional current collector tabs before stacking into a cell core unit. The size of the electrodes decides the final size of the LiC cell because the outside container should match the size of the electrodes. In some embodiments, the length and width of the negative electrode is 0.5 mm to 5 mm larger than that of positive electrode for the LiC cell. In some embodiments of the LiC cell presented herein, the length of the punched positive and negative electrodes may be 30 mm to 250 mm and the width of the punched positive and negative electrodes may be 30 mm to 150 mm.

Having introduced aspects of lithium ion capacitors, additional features and embodiments are now introduced.

In the LiC, activated carbon may be used as the positive electrode (PE), while negative electrode (NE) materials may include various materials, such as soft carbon, hard carbon, graphite and others.

Cell components and designs may be modified to improve the electrochemical performance of the LiC. This may include regard for active material and CNTs selected for the PE, NE active material and CNTs, thickness/mass ratio of PE to NE active layers (without current collectors including aluminum (Al) and copper (Cu)), capacity ratio of PE to NE active layers. PE and NE's size designs and layer numbers, types of material for separators, electrolyte compositions and NE pre-lithiation methods. For PE, the active material may be activated carbon (AC) without binder. For NE, the active material may be hard carbon (HC), soft carbon (SC), graphite (G) and other carbon-based material, and a network of CNT with CMC may be relied on to create a strong carbon structure for active materials. The material of separators can be polypropylene (PP), Polyethylene (PE) and cellulose or other similar materials.

In some embodiments of the LiC cell presented herein, a cell core unit is formed by stacking positive electrodes and negative electrodes through separators in an outer container, for example a laminated outer container. The negative electrodes are pre-doped by pressing the lithium sources including ultra-thin Li films having holes on the surface of the negative electrodes. The "pre-dope" roughly represents a phenomenon in which the lithium ions enter into the negative electrode active layer. The ultra-thin Li films having holes are the lithium ion supply sources to pre-dope the negative electrodes. The lithium source loading process can make sure that the negative electrodes contain uniform lithium on the surface so that when the electrolyte is filled, the negative electrodes can be smoothly and uniformly pre-doped with lithium ions.

In some embodiments of the LiC cell presented herein, the Cu and Al substrates are welded to nickel (Ni) coated copper (Cu) and aluminum (Al) current collector tabs, respectively. After the stacking and welding processes, the electrode units are housed in a container, for example an aluminum laminated formed case that is suitable for the size of the electrode units and three-side heat sealing process will be applied. Then the desired amount of electrolyte was filled into the LIC laminate cell to soak the cell to initiate the pre-doping process by intercalation of the lithium into the negative electrodes. After the cell has been soaked for enough time, then the vacuum sealing process will be applied to the cell in order to remove the excess gas trapped in the LIC laminate cell. As a result, such a constitution can be achieved for the LIC laminated cell.

The organic electrolyte may be a Li-ion battery electrolyte containing a Li salt. To ensure the LIC can achieve desired electrochemical performance, pre-lithiation of the NE may be performed. Some pre-lithiation methods, including electrochemical (EC) and external short circuit (ESC) methods, make use of a piece of Li metal as the sacrificial third electrode to pre-dope the lithium into the graphite or HC electrodes. In the EC pre-lithiation method, the NE and the Li metal are separated with a separator in lithium salt based organic electrolyte and the pre-doping process may be performed by an electronic charger controlling the charge current or voltage.

The positive electrode active material should be capable of reversibly adsorbing or desorbing lithium ion and anions in an electrolyte such as tetrafluoroborate. One of the examples for such active material is activated carbon powder. The specific surface area of the activated carbon is 1,500 m²/g to 2,800 m²/g, preferably 1,600 m²/g to 2,400 m²/g. It is preferred that the diameter of 50% accumulated volume (D50) (average particle diameter) of the activated carbon should be 2 μm to 10 μm. It is particularly more preferred from 3 μm to 8 μm so that the energy density and power density of the LIC laminate cell can be further improved. Some other examples for such material can be carbon black and activated carbon/carbon black/CNT composite material (AC/CB/CNT).

The negative electrode active material should be capable of being reversibly intercalated and de-intercalated with lithium ions. Examples for such active material include graphite-based composite particles, non-graphitizable carbon (hard carbon, (HC)) and graphitizable carbon (soft carbon, (SC)). In some embodiments, the negative electrode active material, the HC and SC particles are preferred because they can achieve higher performance in power performance and the cycling stability than graphite material. However, the graphite material can achieve higher energy performance for the LIC cause the graphite has a higher specific capacity than HC and SC. In order to improve the power performance of the LIC cell, it is preferable that HC and SC having particle size that satisfies a diameter of 50% accumulated volume (D50) within a range of 1.0 to 10 μm; in some embodiments within a range of 2 to 6 μm are used as the negative electrode active material.

It should be noted that it is difficult to produce the HC and SC particles having a diameter of 50% accumulated volume (D50) of less than 10 μm. When the HC and SC particles have a diameter of 50% accumulated volume (D50) of more than 10 μm, a LIC cell which has a sufficiently small internal resistance is difficult to be achieved. In some embodiments, the negative electrode active material has a specific surface area of 0.1 to 200 m$^2$/g, and 0.6 to 60 m$^2$/g is more preferred. The reasons for setting such a range are that the resistance of the LIC cell can be high if the specific surface area of the negative electrode active material is less than 0.1 m$^2$/g and the irreversible capacity of the LIC laminate cell during charging can be high if the specific surface area of the negative electrode active material is more than 200 m$^2$/g.

In the ESC pre-lithiation method, the NE and sacrificial Li metal third electrode are short circuited through the external electric wire connection. However, it takes time for the lithium to dissipate and the cell to be fully lithiated into the NEs in LIC laminate cell with the conventional pre-lithiation method. The time required adds to the cost of this method. Also, in the conventional pre-lithiation method, both the PE and NE current collectors should be porous to make paths for the lithium-ion to travel from the Li metal electrode through the LIC laminate cell, which also increases the manufacturing cost of the electrodes.

Techniques for pre-lithiation as disclosed herein address some of these problems. That is, loading ultra-thin lithium films (abbreviated u-Li) having holes onto the surface of NE can facilitate the process of cell fabrication and speed up pre-lithiation. Because Li metal can be coated directly on carbon electrodes, the current collector doesn't need to be porous to let Li-ion intercalate into the NE. After cell impregnation with electrolyte, the Li sources on the surface of NE electrochemically react with carbon electrode active layer and intercalate into the NEs.

Some advantages of the technology disclosed herein are now presented.

An advantage of the technology disclosed is a lithium-ion capacitor (LIC) which has excellent characteristics in the life time including cycle life and DC life, while also maintaining high energy density and power density.

An advantage of the technology disclosed is a LIC having a binder-free positive electrode, a negative electrode pre-loaded on surface with lithium sources called ultra-thin lithium films (u-Li) having holes, a separator and an organic solvent electrolytic solution with lithium salt as the electrolyte.

An advantage of the technology disclosed is a LIC cell wherein the positive electrode active material is preferred to be activated carbon, carbon black, CNTs, and activated carbon/carbon black/CNTs mixed (AC/CB/CNTs), and the negative electrode active material is preferred to be hard carbon, soft carbon, graphite, CNTs and any possible mix of above material.

An advantage of the technology disclosed is a LIC cell wherein the positive electrode active material activated carbon (AC) has a surface area in a range from 1000 to 3000 m$^2$/g.

An advantage of the technology disclosed is a LIC cell wherein the positive electrode active material activated carbon (AC) has a particle size D50≤10 μm, the negative electrode active material has a particle size D50≤10 μm.

An advantage of the technology disclosed is a LIC cell wherein no polymer binder will be used in cathode materials, which increased the conductivity of the electrode and improves the power performance An advantage of the technology disclosed is a LIC cell wherein the positive electrode formulation can be adjusted in a range of mass ratio between AC/CB and CNT/carbon framework. And no or substantially no polymer binder is used.

An advantage of the technology disclosed is a LIC cell wherein the additives for manufacturing the negative electrodes used in this LIC cell is preferred to be CNTs and carboxymethyl cellulose (CMC).

An advantage of the technology disclosed is a LIC cell wherein the negative electrode formulation can be adjusted in a range of mass ratio between negative electrode active material and CNT/CMC.

An advantage of the technology disclosed is a LIC cell wherein the total thickness of the positive electrode, which includes the thickness of double-side conductive material pre-coated aluminum (Al) foil and the thickness of the double-side active material layers, is 40 μm to 450 μm.

An advantage of the technology disclosed is a LIC cell wherein the total thickness of the negative electrode, which includes the thickness of double-side conductive material pre-coated copper (Cu) foil and the thickness of the double-side active material layers, is 20 μm to 350 μm.

An advantage of the technology disclosed is a LIC cell wherein the thickness ratio of the total thickness of the positive electrode active layers to the total thickness of the negative electrode active layers is preferred to be from 1:2 to 3:1.

An advantage of the technology disclosed is a LIC cell wherein the capacity ratio of the positive electrode active layers to the negative electrode active layers is preferred to be from 1:12 to 1:2.

An advantage of the technology disclosed is a LIC cell wherein the material of the separator is cellulose, polypropylene (PP) and polyethylene (PE) based material.

An advantage of the technology disclosed is a LIC cell wherein the mass per unit area of the Li sources including ultra-thin lithium films having holes loaded onto one side surface of the negative electrode is preferred to be 0.1 mg/cm$^2$ to 3 mg/cm$^2$.

An advantage of the technology disclosed is a LIC cell wherein the thickness of the Li source ultra-thin Li films (u-Li) having holes loaded onto one side surface of the negative electrode is preferred to be 2 to 50 μm.

An advantage of the technology disclosed is a LIC cell wherein the area of said ultra-thin Li films (u-Li) having holes as Li source pre-loaded on one side surface of negative electrode is about 25% to about 100% of the area of the negative electrode.

An advantage of the technology disclosed is a LIC cell wherein the area size percentage range of said holes in said ultra-thin Li films having holes as Li source pre-loaded on the surface of negative electrode is from 0.01% to about 75%.

An advantage of the technology disclosed is a LIC cell wherein the mass ratio percentage of the Li sources including ultra-thin Li films having holes pre-loaded onto one side surface of the negative electrode to the one side negative electrode active layer is preferred to be 7% to 14%.

An advantage of the technology disclosed is a LIC cell wherein the LIC cell is a laminate cell or a prismatic cell.

An advantage of the technology disclosed is an ultra-thin (≤1 mm in thickness) LIC with two ultra-thin (≤50 μm in thickness) single-side positive electrodes, one ultra-thin (≤50 μm in thickness) double-side negative electrode pre-loaded on surface with ultra-thin lithium films (u-Li) having holes, a separator and an organic solvent electrolytic solution with lithium salt as the electrolyte.

An advantage of the technology disclosed includes unexpected solution to the problem of creating a lithium-ion capacitor (LIC) cell which is excellent in the cycling ability and DC life, having high energy density and power density. In the preferred embodiment of the invention the LIC cell system, the negative electrode is pre-doped with lithium ions by applying lithium sources including ultra-thin Li films having holes onto the surface of the negative electrodes.

There are many factors which will influence the electrochemical performance and capacity of the LIC cells when pre-doped in this manner. These factors include: (1) the materials used for the positive and negative electrodes including the active materials and additives; (2) the method of manufacturing the positive and negative electrodes; (3) the thickness of the positive and negative electrodes; (4) the thickness ratio of the total thickness of the positive electrode active layers to the total thickness of the negative electrode active layers; (5) the capacity ratio of the positive electrode active layers to the negative electrode active layers; (6) the material of the separator for the LIC cell; (7) the mass per unit area of the Li sources including ultra-thin Li films having holes pre-loaded on surface of negative electrode; (8) the thickness of the Li sources including ultra-thin Li films having holes loaded on surface of negative electrodes; (9) the area design of the ultra-thin Li films having holes pre-loaded on surface of negative electrodes and the hole area design on the ultra-thin Li films having holes; (10) the mass ratio percentage of the Li sources including ultra-thin Li films having holes pre-loaded onto one side surface of the negative electrode to the one side negative electrode active layer.

An advantage of the technology disclosed is a LIC cell including a polymer binder-free positive electrode, a polymer binder-free negative electrode pre-loaded on surface with lithium sources including ultra-thin lithium films having holes, a separator and an organic solvent electrolytic solution with lithium salt as the electrolyte.

In some embodiments, the positive electrode active material is activated carbon, carbon black, CNTs or activated carbon/carbon black/CNTs mixed (AC/CB/CNTs). In the LIC cell of the present invention, the negative electrode active material is preferred to be graphite, hard carbon and soft carbon or any possible mix of above material.

In some embodiments, the positive electrode active material activated carbon (AC) has a surface area in a range from 1000 to 3000 $m^2/g$.

In some embodiments, the positive electrode active material activated carbon (AC) has a particle size D50≤10 μm, the negative electrode active material has a particle size D50≤10 μm.

In some embodiments, the positive electrode formulation can be adjusted in a range of mass ratio between AC/CB and CNT. that the mass ratio between AC and CB is from 80:20 to 99:1.

In some embodiments, the total thickness of the positive electrode, which includes the thickness of double-side conductive material pre-coated aluminum foil and the thickness of the double-side active material layers, is 40 μm to 450 μm. In the LIC cell of the present invention, the total thickness of the negative electrode, which includes the thickness of double-side conductive material pre-coated copper foil and the thickness of the double-side active material layers, is 20 μm to 350 μm. In the LIC cell of the present invention, the thickness ratio of the total thickness of the positive electrode active layer to the total thickness of the negative electrode active layers is preferred to be from 1:2 to 3:1.

In some embodiments, the capacity ratio of the positive electrode active layers to the negative electrode active layers is preferred to be from 1:12 to 1:2.

In some embodiments, it is preferable that the material of the separator is cellulose, polypropylene (PP) and polyethylene (PE) based material in the LIC cell.

In some embodiments, the mass per unit area of the Li sources including ultra-thin Li films having holes loaded onto one side surface of the negative electrode is preferred to be 0.1 mg/cm$^2$ to 3 mg/cm$^2$.

In some embodiments, the thickness of the Li sources including ultra-thin Li films having holes pre-loaded onto one side surface of the negative electrode is preferred to be 2 to 50 μm.

In some embodiments, the area of the ultra-thin Li films having holes as Li source pre-loaded on surface of negative electrode is preferred to be about 25% to about 100% of the area of the negative electrode.

In some embodiments, the area size percentage range of said holes in said ultra-thin Li films having holes as Li source pre-loaded on surface of negative electrode is preferred to be from about 0.01% to about 75%.

In some embodiments, the mass ratio percentage of the Li sources including ultra-thin Li films having holes pre-loaded onto both side surfaces of the negative electrode to the both side negative electrode active layers are preferred to be 7% to 14%.

In some embodiments, there is provided an ultra-thin (≤1 mm in thickness) LIC cell including two ultra-thin (≤50 μm in thickness) single-side positive electrodes, one ultra-thin (≤50 μm in thickness) double-side negative electrode pre-loaded on surface with ultra-thin lithium films (u-Li) having holes, a separator and an organic solvent electrolytic solution with lithium salt as the electrolyte.

In some embodiments, there is provided a LIC cell having high energy density, high power density and long-life performance.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

As used herein, certain acronyms should be associated with the following terminology: dimethyl carbonate (DMC); lithium difluoro(oxalato)borate (LiDFOB); lithium bis(fluorosulfonyl)imide (LiFSI); propylene carbonate (PC); ethylene carbonate (EC); ethyl methyl carbonate (EMC); ethylene glycol monobutyl ether (EB); diethyl carbonate (DEC); vinylene carbonate (VC); boron carbon nitride (BCN); lithium difluoro(oxalato)borate (LiDFOB); lithium bis(oxalato)borate (LiBOB); lithium difluoro bis(oxalato)phosphate (LiDFOP); lithium bis(trifluoromethanesulfonyl)imide (LiTFSI).

Various other components may be included and called upon for providing for aspects of the teachings herein. For example, additional materials, combinations of materials and/or omission of materials may be used to provide for added embodiments that are within the scope of the teachings herein. A variety of modifications of the teachings herein may be realized. Generally, modifications may be designed according to the needs of a user, designer, manufacturer or other similarly interested party. The modifications may be intended to meet a particular standard of performance considered important by that party.

The appended claims or claim elements should not be construed to invoke 35 U.S.C. § 112(f) unless the words "means for" or "step for" are explicitly used in the particular claim.

When introducing elements of the present invention or the embodiment(s) thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements. As used herein, the term "exemplary" is not intended to imply a superlative example. Rather, "exemplary" refers to an example of an embodiment that is one of many possible embodiments.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A lithium ion capacitor apparatus, comprising:
a positive electrode comprising a network of carbon that is substantially free of binder material;
a negative electrode comprising a network of carbon that is substantially free of binder material separated from the positive electrode by a separator;
an organic solvent electrolytic solution with lithium salt as an electrolyte, comprising lithium bis(fluorosulfonyl)imide in ethylene carbonate, ethylene glycol monobutyl ether, diethyl carbonate and propylene carbonate; and
a film of lithium comprising no holes and disposed on the negative electrode to provide for pre-lithiation of the capacitor;
wherein at least one of the positive electrode and the negative electrode comprises:
a network of high aspect ratio carbon elements defining void spaces within the network; and
a plurality of electrode active material particles disposed in the void spaces within the network and enmeshed in the network.

2. The apparatus of claim 1, wherein the high aspect ratio carbon elements comprise elements each having two major dimensions and one minor dimension, wherein the ratio of the length of each of the major dimensions is at least 10 times that of the minor dimension.

3. The apparatus of claim 1, wherein the high aspect ratio carbon elements comprise elements each having two major dimensions and one minor dimension, wherein the ratio of the length of each of the major dimensions is at least 100 times that of the minor dimension.

4. The apparatus of claim 1, wherein the high aspect ratio carbon elements comprise elements each having two major dimensions and one minor dimension, wherein the ratio of the length of each of the major dimensions is at least 1,000 times that of the minor dimension.

5. The apparatus of claim 1, wherein the high aspect ratio carbon elements comprise elements each having two major dimensions and one minor dimension, wherein the ratio of the length of each of the major dimensions is at least 10,0000 times that of the minor dimension.

6. The apparatus of claim 1, wherein the high aspect ratio carbon elements comprise elements each having one major dimension and two minor dimensions, wherein the ratio of the length of the major dimension is at least 10 times that of each of the minor dimensions.

7. The apparatus of claim 1, wherein the high aspect ratio carbon elements comprise elements each having one major dimension and two minor dimensions, wherein the ratio of the length of the major dimension is at least 100 times that of each of the minor dimensions.

8. The apparatus of claim 1, wherein the high aspect ratio carbon elements comprise elements each having one major dimension and two minor dimensions, wherein the ratio of the length of the major dimension is at least 1,000 times that of each of the minor dimensions.

9. The apparatus of claim 1, wherein the high aspect ratio carbon elements comprise elements each having one major dimension and two minor dimensions, wherein the ratio of the length of the major dimension is at least 10,000 times that of each of the minor dimensions.

10. The apparatus of claim 1, wherein the high aspect ratio carbon elements comprise carbon nanotubes or carbon nanotube bundles.

11. The apparatus of claim 1, wherein the high aspect ratio carbon elements comprise graphene flakes.

12. The apparatus of claim 1, wherein an electrode active layer contains less than 10% by weight polymeric binders disposed in the void spaces.

13. The apparatus of claim 12, wherein the electrode active layer contains less than 1% by weight polymeric binders disposed in the void spaces.

14. The apparatus of claim 12, wherein the electrode active layer is substantially free of polymeric material other than the surface treatment.

15. The apparatus of claim 1, wherein the electrode active layer is substantially free of polymeric material.

16. The apparatus of claim 1, wherein the network is at least 90% carbon by weight.

17. The apparatus of claim 1, wherein the network is at least 95% carbon by weight.

18. The apparatus of claim 1, wherein the network is at least 99% carbon by weight.

19. The apparatus of claim 1, wherein the network is at least 99.9% carbon by weight.

20. The apparatus of claim 1, wherein mass loading for the film of lithium disposed on the negative electrode is less than 10% of the negative electrode active layer weight.

* * * * *